(12) United States Patent
Ryu et al.

(10) Patent No.: US 9,291,852 B2
(45) Date of Patent: Mar. 22, 2016

(54) DISPLAY APPARATUS

(71) Applicant: SAMSUNG DISPLAY CO., LTD., Yongin, Gyeonggi-Do (KR)

(72) Inventors: Tae Yong Ryu, Hwaseong-si (KR); Yongkyu Kang, Yongin-si (KR); Min-Young Song, Asan-si (KR); Sangwon Lee, Seongnam-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 416 days.

(21) Appl. No.: 13/738,383

(22) Filed: Jan. 10, 2013

(65) Prior Publication Data

US 2014/0049723 A1    Feb. 20, 2014

(30) Foreign Application Priority Data

Aug. 20, 2012 (KR) .................. 10-2012-0090846

(51) Int. Cl.
*G02F 1/1335* (2006.01)
*G02F 1/1333* (2006.01)
*F21V 8/00* (2006.01)

(52) U.S. Cl.
CPC ........ *G02F 1/133606* (2013.01); *G02B 6/0036* (2013.01); *G02B 6/0038* (2013.01); *G02B 6/0058* (2013.01); *G02F 1/1333* (2013.01); *G02F 1/133615* (2013.01)

(58) Field of Classification Search
CPC .. G02B 6/0038; G02B 6/0036; G02B 6/0058; G02F 1/133606; G02F 1/1333
USPC ....................................... 362/620
See application file for complete search history.

(56) References Cited

U.S. PATENT DOCUMENTS

| 6,712,482 | B2 | 3/2004 | Kawakami et al. |
| 7,478,942 | B2 * | 1/2009 | Kim et al. ............. 362/620 |
| 8,158,040 | B2 | 4/2012 | Kim et al. |
| 8,678,635 | B2 * | 3/2014 | Goto et al. ............. 362/613 |
| 2006/0133113 | A1 | 6/2006 | Koike et al. |
| 2010/0027294 | A1 | 2/2010 | Lee et al. |
| 2010/0295762 | A1 * | 11/2010 | Yeom et al. ............. 345/87 |

FOREIGN PATENT DOCUMENTS

| JP | 2000221329 A | 8/2000 |
| JP | 2002133907 A | 5/2002 |
| KR | 100661147 B1 | 12/2006 |
| KR | 100663297 B1 | 12/2006 |
| KR | 100692203 B1 | 3/2007 |
| KR | 100742562 B1 | 7/2007 |
| KR | 1020110012222 A | 2/2011 |
| KR | 101039321 B1 | 5/2011 |

* cited by examiner

*Primary Examiner* — Richard Kim
*Assistant Examiner* — Kendrick Hsu
(74) *Attorney, Agent, or Firm* — Cantor Colburn LLP (57) ABSTRACT

A display apparatus includes a backlight assembly which provides a light and a display panel which receives the light provided from the backlight assembly to display an image. The backlight assembly includes a light source which generates the light, and a light guide plate. The light guide plate receives the light generated from the light source through an incident surface thereof as an incident light, and outputs the incident light through an exit surface thereof as an exit light. The light guide plate includes a first optical pattern and a second optical pattern. The first optical pattern is disposed corresponding to a first area of the exit surface and collects the incident light. The second optical pattern is disposed corresponding to a remaining second area of the exit surface excluding the first area, and collects the exit light.

18 Claims, 9 Drawing Sheets

DISPLAY APPARATUS

This patent application claims priority to Korean Patent Application No. 10-2012-0090846, filed on Aug. 20, 2012, and all the benefits accruing therefrom under 35 U.S.C. §119, the contents of which are hereby incorporated by reference.

BACKGROUND

1. Field

The disclosure relates to a display apparatus. More particularly, the disclosure relates to a display apparatus capable of displaying an image using light provided from a backlight assembly.

2. Description of the Related Art

A display apparatus, which includes a non-self emissive display panel, e.g., a liquid crystal display, includes a backlight assembly, and the non-self emissive display panel displays an image using light generated by and provided from the backlight assembly.

To improve front brightness of the display apparatus, in general, the backlight assembly includes a prism sheet that collects the light. The prism sheet refracts the light incident thereto to allow the refracted light to travel in a direction substantially vertical to the prism sheet. Accordingly, due to optical properties of the prism sheet, the front brightness of the display apparatus is improved.

While the prism sheet has the above-mentioned superior optical characteristic, the prism sheet is extremely expensive and undesirably increases a manufacturing cost and an overall cost of a display apparatus employing the prism sheet. Thus, there remains a need reduce a manufacturing cost of the display apparatus while not compromising the front brightness of the display apparatus.

SUMMARY

One or more exemplary embodiment of the invention provides a display apparatus capable of improving front brightness thereof, without employing a prism sheet.

One or more exemplary embodiment of the invention provides a display apparatus includes a backlight assembly which provides a light, and a display panel which receives the light provided from the backlight assembly and displays an image.

The backlight assembly includes a light source which generates the light, and a light guide plate. The light guide plate receives the light generated by the light source, through an incident surface thereof as an incident light and outputs the incident light through an exit surface thereof as an exit light.

The light guide plate includes a first optical pattern and a second optical pattern. The first optical pattern is disposed corresponding to a first area of the exit surface and collects the incident light. The second optical pattern is disposed corresponding to a second area, which corresponds to a remaining area of the exit surface except for the first area, and collects the exit light.

According to the one or more exemplary embodiment of the invention, the incident light is collected by the first optical pattern of the light guide plate and the exit light is collected by the second optical pattern of the light guide plate. In addition, since the second optical pattern refracts the incident light and outputs the refracted incident light through the exit surface, a printed pattern or a concavo-convex pattern of a conventional light guide plate, which are related to the output of the light, may be replaced with the second optical pattern.

In addition, since the second optical pattern collects the exit light, a prism sheet used to collect the light in a conventional backlight assembly may be replaced with the second optical pattern. Accordingly, the prism sheet may be omitted from the backlight assembly, so that a manufacturing cost of the backlight assembly may be reduced.

Further, the first optical pattern and the second optical pattern are disposed on and integral with a remainder of the light guide plate. Thus, the light guide plate provided including the first and second optical patterns may be formed in a one-step molding process, and thus the light guide plate may be easily manufactured.

BRIEF DESCRIPTION OF THE DRAWINGS

The above and other advantages of the invention will become readily apparent by reference to the following detailed description when considered in conjunction with the accompanying drawings where.

DETAILED DESCRIPTION

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "beneath,", "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a," "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the invention will be explained in detail with reference to the accompanying drawings.

Figure 1:
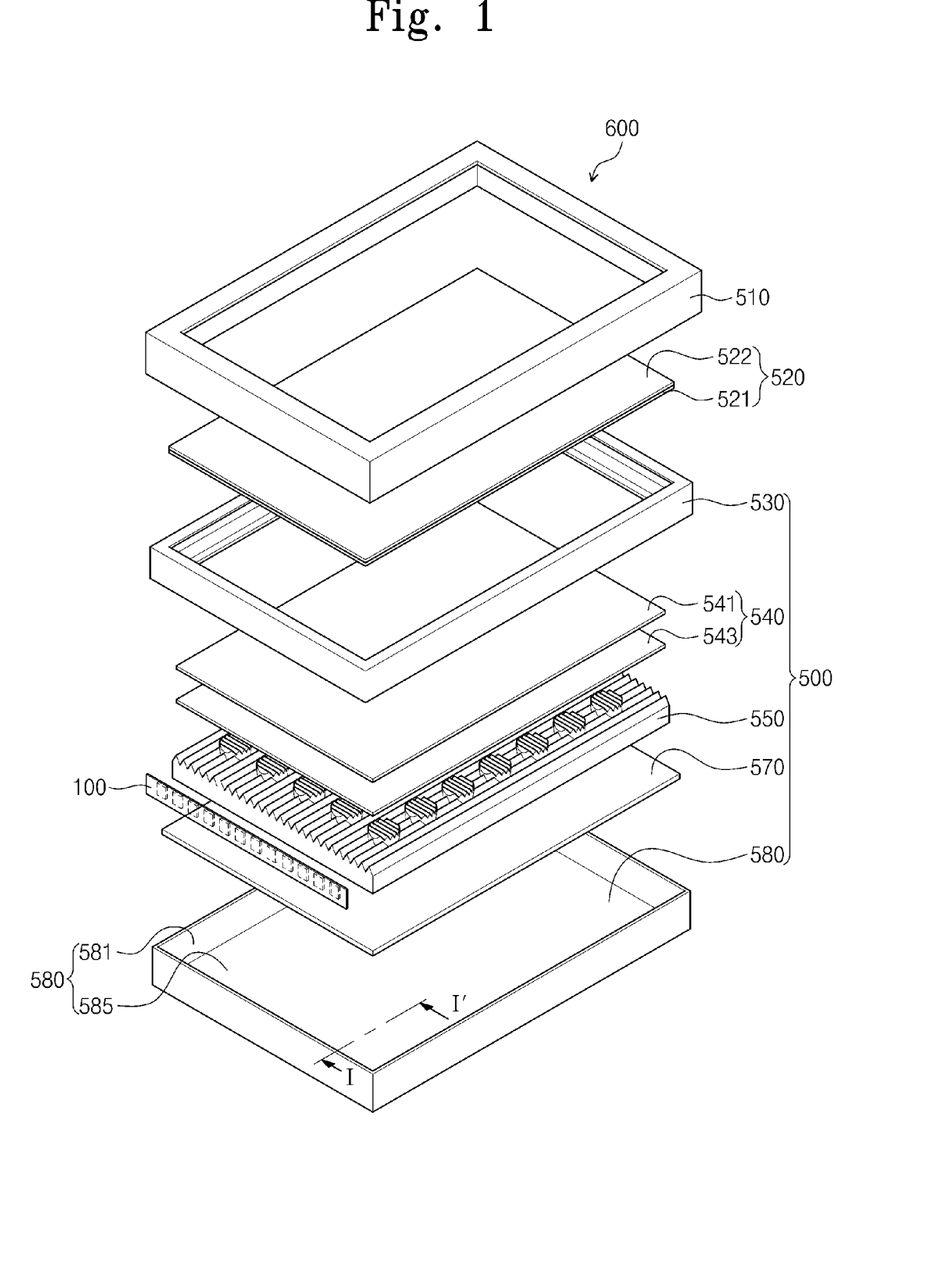
FIG. 1 is an exploded perspective view showing an exemplary embodiment of a display apparatus according to the invention.
Figure 2A:
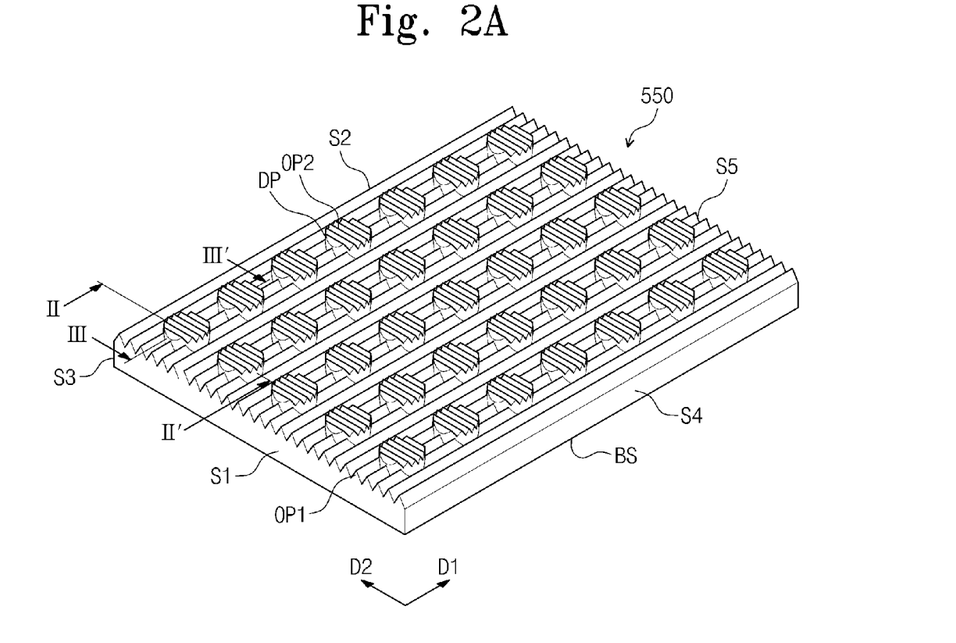
FIG. 2A is a perspective view showing an exemplary embodiment of a light guide plate in FIG. 1.
Figure 2B:
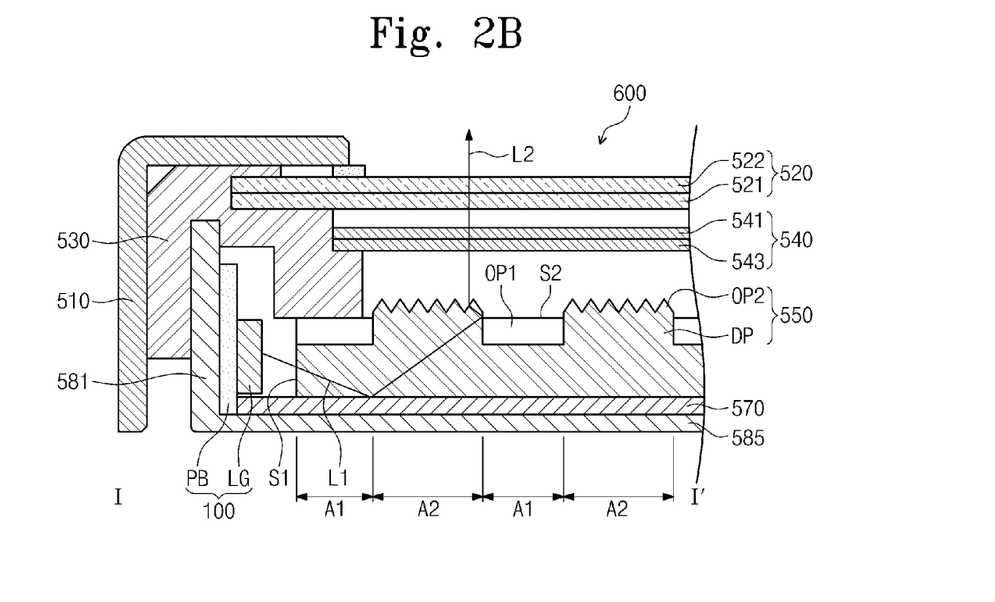
FIG. 2B is a cross-sectional view taken along line I-I' of FIG. 1.

FIG. 1 is an exploded perspective view showing an exemplary embodiment of a display apparatus according to the invention, FIG. 2A is a perspective view showing an exemplary embodiment of a light guide plate in FIG. 1, and FIG. 2B is a cross-sectional view taken along line I-I' of FIG. 1.

Referring to FIGS. 1, 2A and 2B, a display apparatus 600 includes a backlight assembly 500 and a display panel 520. The backlight assembly 500 generates light and provides the light to the display panel, and the display panel 520 displays an image using the light from the backlight assembly 500.

In the illustrated exemplary embodiment, the display panel 520 may be a liquid crystal display panel. Where the display panel 520 is the liquid crystal display panel, the display panel 520 includes a first substrate 521 on which a pixel electrode (not shown) is disposed, a second substrate 522 on which a common electrode (not shown) is disposed to face the pixel electrode, and a liquid crystal layer (not shown) interposed between the first substrate 521 and the second substrate 522. The display panel 520 may include a plurality of pixel electrodes. The display panel 520, however, should not be limited to the liquid crystal display panel. That is, the display panel 520 may be any of a number of various display panels, which are non-self emissive, e.g., an electrowetting display panel, a nanocrystal display panel, etc.

The backlight assembly 500 includes a light source 100, a receiving container 580, a reflection plate 570, a light guide plate 550, a mold frame 530, a plurality of sheets 540 and a cover member 510.

The light source 100 generates light. The light source 100 includes a light emitting diode ("LED") package LG and a printed circuit board PB, and is located at a position adjacent to an incident surface S1 of the light guide plate 550. The light source 100 may include a plurality of LED packages LG. The LED package LG is mounted on the printed circuit board PB, and generates and emits the light in response to a source voltage provided through the printed circuit board PB.

The receiving container 580 includes a bottom portion 585, and a sidewall 581 extended from the bottom portion 585 to accommodate elements of the backlight assembly 500 therein. The receiving container 580 may be consider as including a plurality of sidewalls 581 extended from the bottom portion 585 to define a receiving space. In the illustrated exemplary embodiment, the light source 100 is disposed on an inner side surface of one sidewall 581, but should not be limited thereto or thereby. That is, the light source 100 may be provided in plural in the backlight assembly 500, and the plural light sources 100 are disposed on the inner side surface of two or more sidewalls 581 of the receiving container 580.

The light guide plate 550 receives the light generated by the light source 100. In detail, the light generated by the light source 100 is incident to the light guide plate 550 through the incident surface S1, and the light incident to the light guide plate 550 exits through an exit surface S2 of the light guide plate 520. Hereinafter, for the convenience of explanation, the light incident into the light guide plate 550 is referred to as an incident light L1 and the light exiting from the light guide plate 550 is referred to as an exit light L2.

Most of the incident light L1 exits from the light guide plate 550 through a second optical pattern OP2 of the light guide plate 550, but a portion of the incident light L1 exits from the light guide plate 550 through a first optical pattern OP1 of the light guide plate 550 located at a position adjacent to the second optical pattern OP2. Accordingly, the exit surface S2 of the light guide plate 550 should not be limited to the surface of the second optical pattern OP. That is, the exit surface S2 of the light guide plate 550 may be a whole surface of the light guide plate 550 on which the first and second optical patterns OP1 and OP2 are disposed, such as including the first and second optical patterns OP1 and OP2.

The light guide plate 550 includes the first optical pattern OP1, a plurality of dot portions DP and the second optical pattern OP2. The first optical pattern OP1 is disposed in a first area A1 of the exit surface S2 to collect the incident light L1. In the illustrated exemplary embodiment, the first optical pattern OP1 includes first protrusions P1 (refer to FIG. 3A) each having a prism shape extended from a base plane of the light guide plate 550 when viewed in a cross-sectional view, and each of the first protrusions P1 has a longitudinal axis which is extended in a first direction D1 substantially vertical (e.g., perpendicular) to the incident surface S1.

Thus, when the incident light L1 incident into the light guide plate 550 travels to an opposite surface S5 facing the incident surface S1, the straightness of the incident light L1 is improved by the first optical pattern OP1. As a result, leakage of the incident light L1 through a first side surface S3 and a second side surface S4 of the light guide plate 550 may be reduced or effectively prevented.

Each of the dot portions DP is disposed in a second area A2 corresponding to a remaining area of the exit surface S2, and the second optical pattern OP2 is disposed on a corresponding dot portion DP of the plurality of dot portions DP. The second optical pattern OP2 has a different directivity from that of the first optical pattern OP1 to collect the exit light L2.

In the illustrated exemplary embodiment, the second optical pattern OP2 includes a plurality of protrusions P2 (refer to FIG. 3B) each having a prism shape extended from a base plane of the light guide plate 550 when viewed in a cross-sectional view, and each of the protrusions P2 has a longitudinal axis which is extended in a second direction D2 substantially perpendicular to the first direction D1. Accordingly, as shown in FIG. 2B, the incident light L1, which initially travels in the direction inclined to the display panel 520, is refracted by the second optical pattern OP2, and thus a path of the incident light L1 is changed such that the incident light travels in the direction substantially vertical to the display panel 520. As a result, front brightness of the display panel 520 may be improved.

Figure 3A:
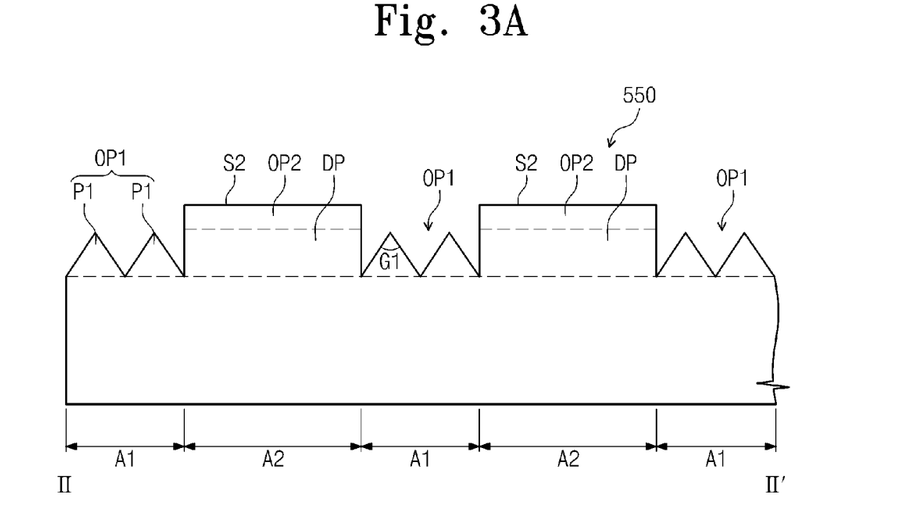
FIG. 3A is a cross-sectional view taken along line II-II' of FIG. 2A.
Figure 3B:
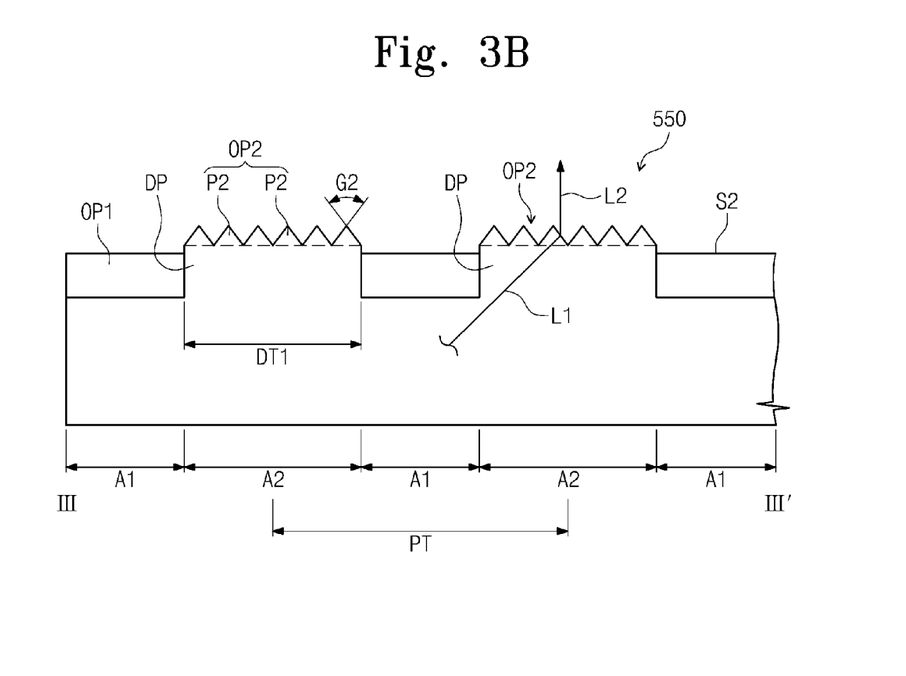
FIG. 3B is a cross-sectional view taken along line III-III of FIG. 2A.

In the exemplary embodiment of the light guide plate 550 illustrated in FIGS. 3A and 3B, the exit surface S2 in the first area A1 and the exit surface S2 in the second area A2 are in different planes. The plane of the exit surface S2 in the second area A2 is further from a bottom surface BS (refer to FIG. 2A) of the light guide plate 550 than the plane of the exit surface S2 in the first area A1, however, the invention is not limited thereto or thereby.

In addition, as described above, since most of the incident light L1 is refracted by the second optical pattern OP2 to be changed to the exit light L2 exiting from the light guide plate 550, the second optical pattern OP2 allows the incident light L1 to exit from the light guide plate 550 while collecting the exit light L2.

The reflection plate 570 includes a light reflecting material, e.g., polyethylene terephthalate ("PET"), aluminum, etc., and is disposed between the bottom portion 585 of the receiving container 580 and the light guide plate 550. Therefore, lights, which are emitted by the light source 100 and not directed to the light guide plate 550, are reflected by the reflection plate 570 and then incident into the light guide plate 550.

The mold frame 530 is coupled to the receiving container 580, overlaps an edge of the light guide plate 550 and maintains a position of the light guide plate 550 on the bottom portion 585 of the receiving container 580. A portion of the mold frame 530 is extended substantially parallel to the bottom portion 585, and thus the sheets 540 and the display panel 520 are mounted on the portion of the mold frame 530.

The sheets 540 are disposed between the light guide plate 550 and the display panel 520. In the illustrated exemplary embodiment, the sheets 540 include a diffusion sheet 543 diffusing the light and a protection sheet 541 protecting a rear surface of the display panel 520. When the exit light L2 is provided to the display panel 520 after passing through the sheets 540, the exit light L2 is diffused by the sheets 540.

As described above, the second optical pattern OP2 collects the exit light L2, and thus a prism sheet omitted from the sheets 540 may be replaced with the second optical pattern OP2.

An opening is defined in the cover member 510 to expose a display area of the display panel 520, and the cover member 510 covers (e.g., overlaps) edges of the display panel 520 while being coupled to the receiving container 580. Due to the cover member 510 coupled to the receiving container 580, the backlight assembly 500 may be stably accommodated in the receiving container 580.

FIG. 3A is a cross-sectional view taken along line II-II' of FIG. 2A and FIG. 3B is a cross-sectional view taken along line III-III of FIG. 2A.

Referring to FIGS. 2A and 3A, the first optical pattern OP1 is disposed corresponding to the first area A1 of the exit surface S2 and includes the first protrusions P1.

When viewed in a cross-sectional view, each of the first protrusions P1 has the prism shape extended from the base plane of the light guide plate 550, for example, indicated by the lower dotted horizontal line in FIG. 3A, and has the longitudinal axis which is extended in the first direction D1. The first protrusions P1 are successively arranged in the second direction D2 without overlapping or being spaced apart from each other. In addition, a first angle G1 of an upper corner portion (e.g., apex) of the prism shape of the first protrusions P1 is in a range of about 80 degrees to about 145 degrees. Where the first angle G1 is from about 80 degrees to about 145 degrees, the straightness of the incident light L1 (refer to FIG. 2B) collected by the first optical pattern OP1 can be secured.

Referring to FIGS. 2A and 3B, the dot portions DP are disposed corresponding to the second area A2 of the exit surface S2. The dot portions DP may be spaced apart from each other. As an example, the dot portions DP may be arranged in a matrix form with rows and columns, but is not limited thereto or thereby.

In the illustrated exemplary embodiment, each of the dot portions DP has a circular shape when viewed in a plan view, but should not be limited to the circular planar shape. In an alternative exemplary embodiment, for instance, each of the dot portions DP may have a polygonal planar shape, e.g., a triangular or rectangular shape, or an oval planar shape.

The second optical pattern OP2 is disposed on the corresponding dot portion DP of the plurality of dot portions DP and includes the second protrusions P2. Each of the second protrusions P2 has the prism shape extended from a base plane of the light guide plate 550 for example, indicated by the upper dotted horizontal line in FIG. 3A, when viewed in a cross-sectional view and has the longitudinal axis which is extended in the second direction D2. In addition, a second angle G2 of an apex of the prism shape of the second protrusions P2 is in a range of about 80 degrees to about 145 degrees. Thus, the exit light L2 (refer to FIG. 2B) may be collected by the second optical pattern OP2.

Referring to FIG. 3B, each dot portion DP has a width DT1 of about 10 micrometers to about 800 micrometers, taken in a direction perpendicular to the longitudinal axis if the second protrusions P2. When the width DT1 is smaller than about 10 micrometers, manufacturing of the dot portions DP may be difficult since a size of the dot portions DP is relatively small. In addition, when the width DT1 exceeds about 800 micrometers, the dot portions DP may be undesirably perceived by a user through the display panel 520.

In addition, when a length between centers of two dot portions DP adjacent to each other is referred to as a pitch PT, the pitch PT may be defined based on a number of variables, e.g., a size of the display panel 520, a size of the width DT1, etc.

The light guide plate 550, the dot portions DP, the first optical pattern OP1 and the second optical pattern OP2 may be integrally formed with each other. That is, the light guide plate 550 may be a single, unitary, indivisible member. In one exemplary embodiment, when a molding member having an engraving pattern corresponding to the dot portions DP and the first and second optical patterns OP1 and OP2 is utilized, an integral light guide plate 550 including the dot portions DP and the first and second optical patterns OP1 and OP2 may be formed in a one-step molding process with the molding member. Accordingly, the light guide plate 550 according to the illustrated exemplary embodiment may be easily manufactured.

Figure 4A:
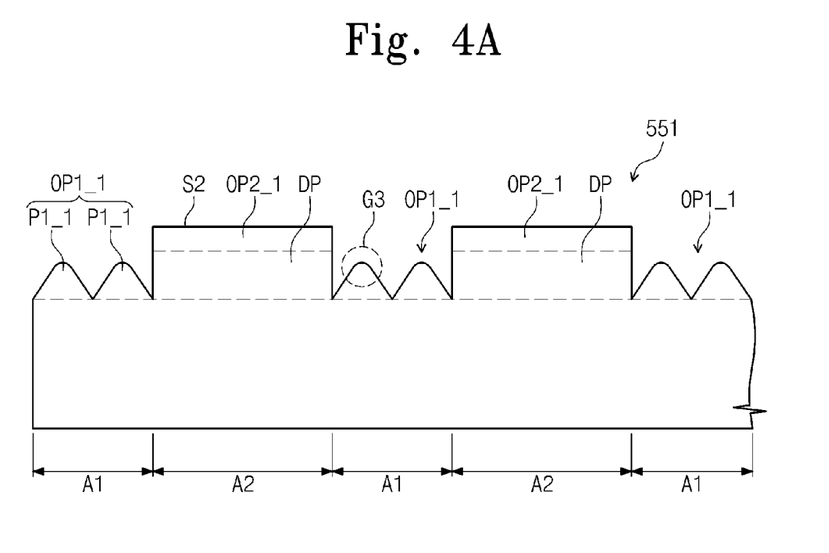
FIGS. 4A and 4B are cross-sectional views showing another exemplary embodiment of a light guide plate according to the invention.
Figure 4B:
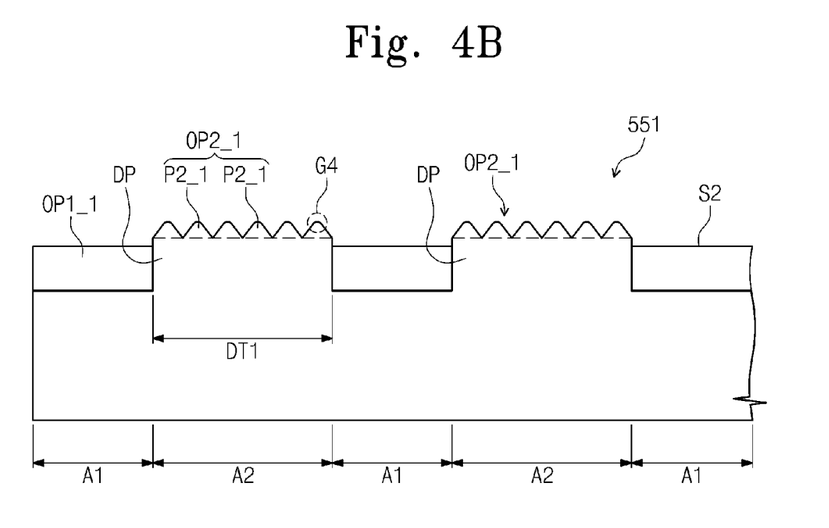

FIGS. 4A and 4B are cross-sectional views showing another exemplary embodiment of a light guide plate according to the invention. A light guide plate 551 shown in FIGS. 4A and 4B has the same structure as that of the light guide plate 550 shown in FIGS. 3A and 3B except for first protrusions P1_1 of first optical pattern OP1_1 and second protrusions P2_1 of second optical pattern OP2_1. In FIGS. 4A and 4B, therefore, the same elements will be assigned with the same reference numerals as those in FIGS. 3A and 3B except for the first and second protrusions P1_1 and P2_1, and detailed descriptions of the same elements will be omitted.

FIG. 4A shows a cross section of the light guide plate 551 taken along a direction vertical to a direction in which a longitudinal axis of the first protrusions P1_1 is extended. Each of the first protrusions P1_1 has a prism shape extended from a first base plane and of which an apex G3 thereof is curved as shown in FIG. 4A. Sides of the prism shape extended from the apex G3 to a base line of the prism shape at the first base plane may be linear as illustrated in FIG. 4A, but are not limited thereto or thereby. Where the apex G3 of the first protrusions P1_1 has a curved shape, the exit light exiting through the apex G3 is scattered, so that a bright line caused by the concentration of the exit light on a portion of the display area of the display panel 520 may be reduced or effectively prevented. In addition, in order to effectively scatter the exit light, a radius of curvature of the apex G3 is in a range from about 1 micrometers to about 10 micrometers, or a ratio of a length of the base line of the prism shape to a height of the prism shape is in a range from about 10:1 to about 10:6. The base line may be a distance between the sides of the prism shape along the first base plane, and the height may be a maximum distance from the base line to the apex G3 taken perpendicular to the base line.

FIG. 4B shows a cross section of the light guide plate 551 taken along a direction vertical to a direction in which a longitudinal axis of the second protrusions P2_1 is extended. Similar to the first protrusions P1_1, each of the second protrusions P2_1 has a prism shape extended from a second base plane and of which an apex thereof is curved as shown in FIG. 4B. Sides of the prism shape extended from the apex G4 to a base line of the prism shape at the second base plane may be linear as illustrated in FIG. 4B, but are not limited thereto or thereby. The first and second base planes are different from each other.

Where the apex G4 of the second protrusions P2_2 has a curved shape, the exit light exiting through the apex G4 is scattered. In addition, in order to effectively scatter the exit light, a radius of curvature of the apex G4 is in a range of about 1 micrometer to about 20 micrometers.

Figure 5A:
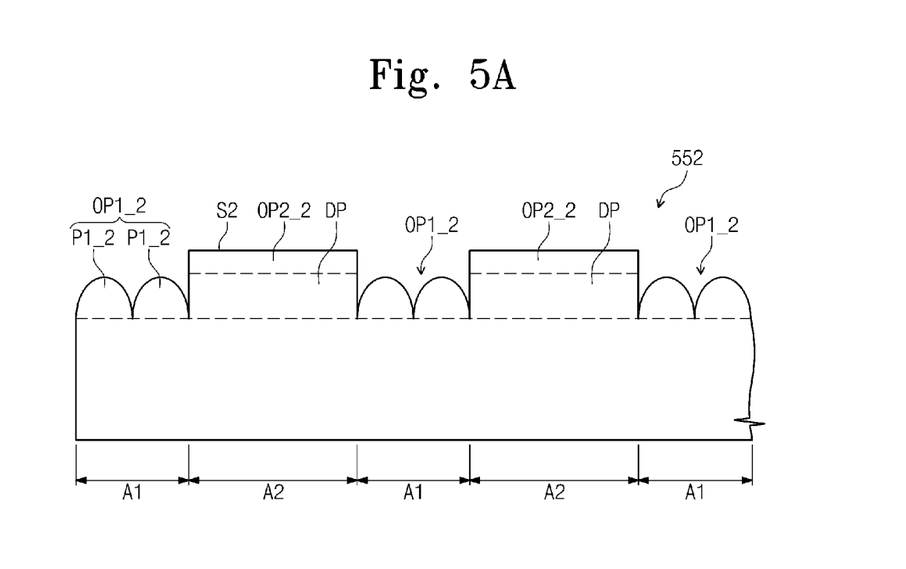
FIGS. 5A and 5B are cross-sectional views showing still another exemplary embodiment of a light guide plate according to the invention.
Figure 5B:
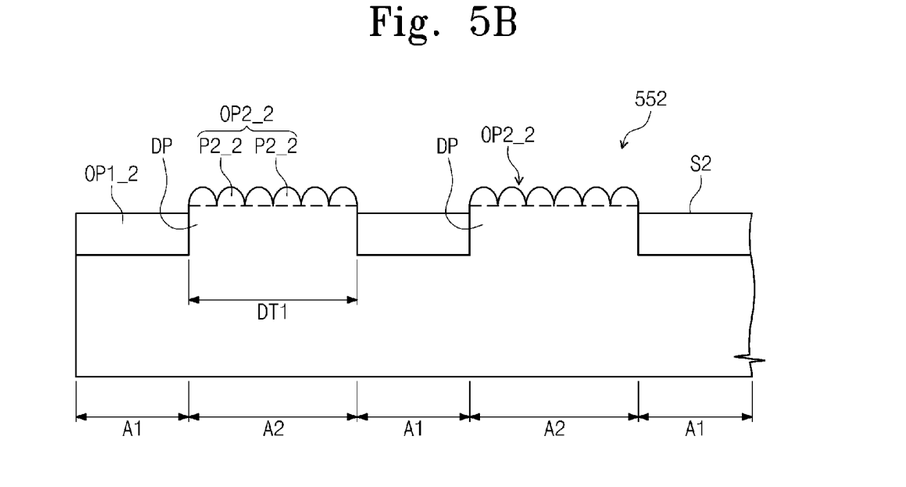

FIGS. 5A and 5B are cross-sectional views showing still another exemplary embodiment of a light guide plate according to the invention.

Referring to FIGS. 5A and 5B, a first optical pattern OP1_2 of a light guide plate 552 includes a plurality of first protrusions P1_2, and each of the first protrusions P1_2 has a lenticular shape extending from a first base plane when viewed in a sectional view. In addition, a second optical pattern OP2_2 of the light guide plate 552 includes a plurality of second protrusions P2_2, and each of the second protrusions P2_2 has the lenticular shape extending from a second base plane when viewed in a sectional view. In the illustrated exemplary embodiment, a radius of curvature of the lenticular shape is in a range from about 1 micrometer to about 100 micrometers, but should not be limited thereto or thereby.

Figure 6:
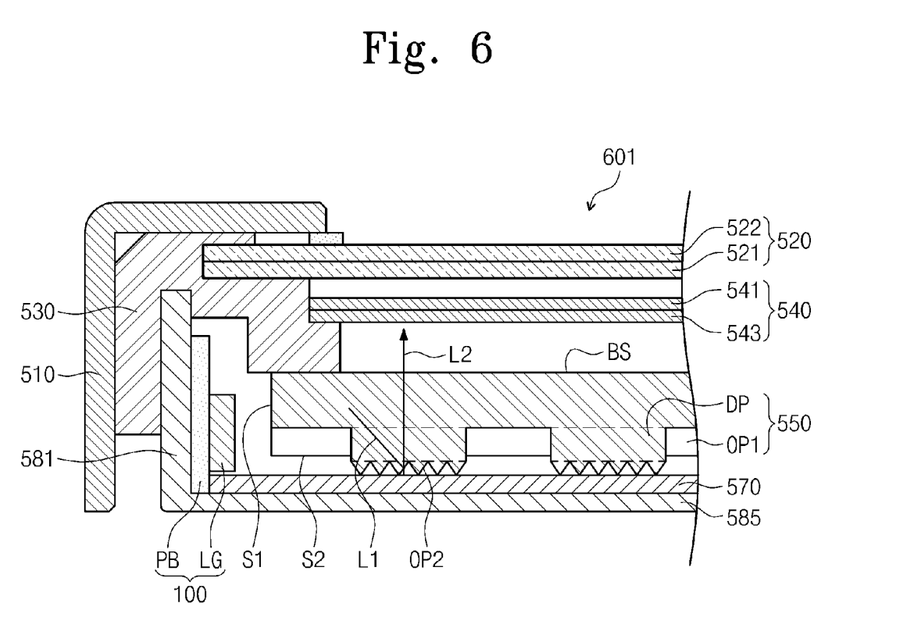
FIG. 6 is a cross-sectional view showing another exemplary embodiment of a display apparatus according to the invention.

FIG. 6 is a cross-sectional view showing another exemplary embodiment of a display apparatus according to the invention. A display apparatus 601 shown in FIG. 6 has the same structure as that of the display apparatus 600 shown in FIG. 2B except for the light guide plate 550 accommodated in the receiving container 580. In FIG. 6, therefore, the same elements will be assigned with the same reference numerals as those in FIG. 2B, and detailed descriptions of the same elements will be omitted.

Referring to FIG. 6, the light guide plate 550 is accommodated in the receiving container 580 including the bottom portion 585 and a sidewall 581. The light guide plate 550 is accommodated in the receiving container 580 such that the first and second optical patterns OP1 and OP2 are disposed to face the reflection plate 570 and the bottom portion 585. In detail, the bottom surface BS of the light guide plate 550 is disposed to face upward in a direction opposite to the bottom portion 585 of the receiving container. In other words, the bottom surface BS of the light guide plate 550 is located closer to the display panel 520 than the first and second optical patterns OP1 and OP2. The first and second optical patterns of the light guide plate 550 illustrated in FIG. 6 is not limited, and may include any of the first and second optical pattern of the exemplary embodiments in FIGS. 3A through 5B.

Where the bottom surface BS of the light guide plate 550 is located closer to the display panel 520 than the first and second optical patterns OP1 and OP2, the incident light L1, which is totally reflected in the light guide plate 550, is scattered by the second optical pattern OP2 while exiting from the light guide plate 550 through the exit surface S2, and then the exited incident light L1 is reflected by the reflection plate 570 to pass through the light guide plate 550 again. As a result, the exit light L2 exiting upward from the light guide plate 550 passes the bottom surface BS of the light guide plate 550.

When a length of an optical path between the light guide plate 550 from which the incident light L1 exits and the diffusion sheet 543 to which the exit light L2 reaches is referred to as an optical distance, the optical distance increases by the length of the optical path through the reflection plate 570 and the light guide plate 550. Accordingly, the diffusion sheet 543 may be at the optical distance sufficient to diffuse the exit light L2.

Figure 7:
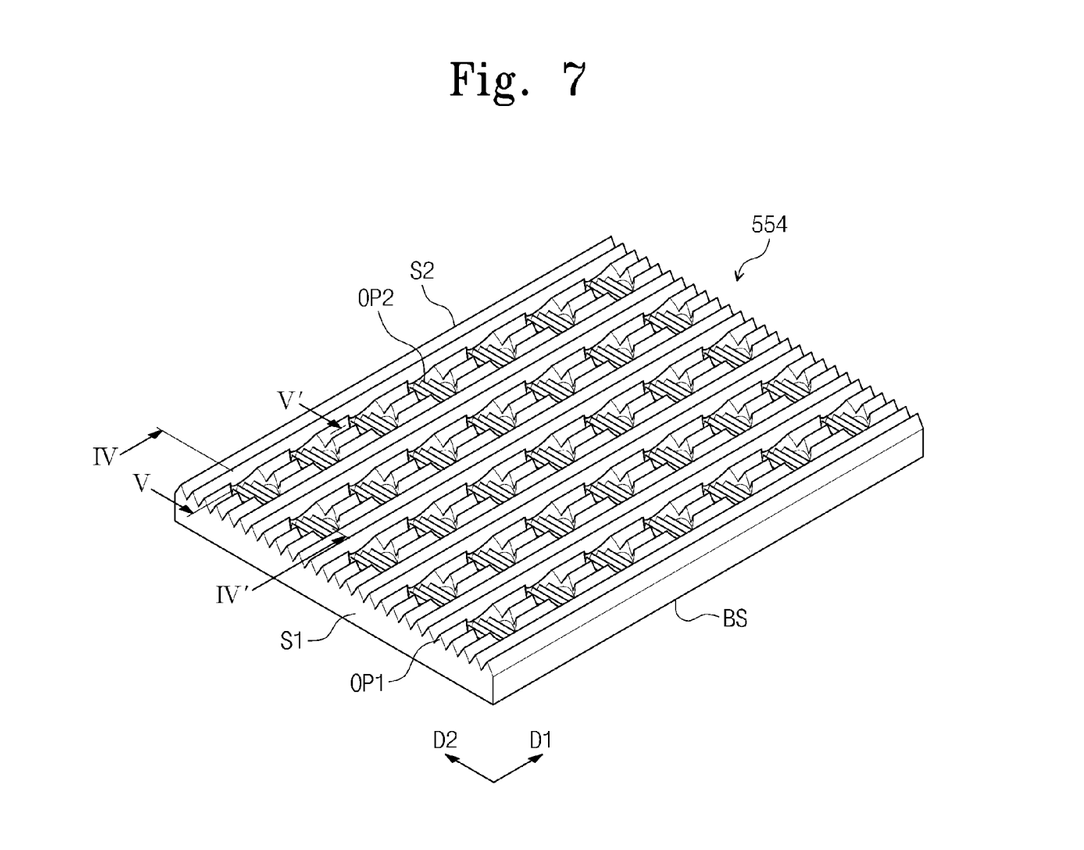
FIG. 7 is a perspective view showing yet another exemplary embodiment of a light guide plate according to the invention.
Figure 8A:
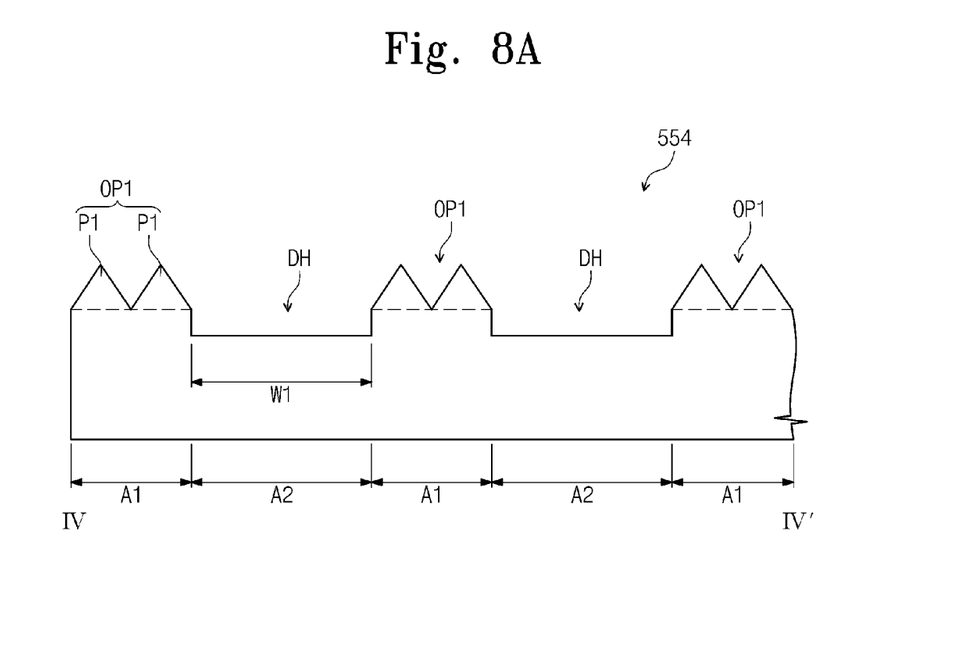
FIG. 8A is a cross-sectional view taken along line IV-IV' of FIG. 7.
Figure 8B:
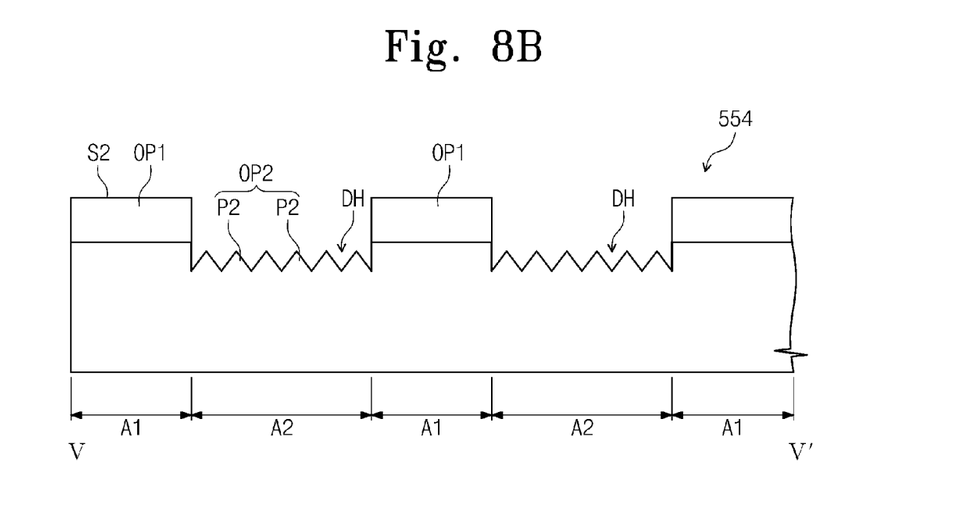
FIG. 8B is a cross-sectional view taken along line V-V' of FIG. 7.

FIG. 7 is a perspective view showing yet another exemplary embodiment of a light guide plate according to the invention, FIG. 8A is a cross-sectional view taken along line IV-IV' of FIG. 7, and FIG. 8B is a cross-sectional view taken along line V-V' of FIG. 7. In FIGS. 7, 8A and 8B, the same reference numerals denote the same elements in FIGS. 2A, 2B, 3A and 3B, and thus detailed descriptions of the same elements will be omitted.

Referring to FIGS. 7, 8A, and 8B, a light guide plate 554 is provided with a plurality of dot recesses DH. The second optical pattern OP2 is disposed in a corresponding dot recess DH of the plurality of dot recesses DH. That is, the dot portions DP as described in FIGS. 3A and 3B are replaced with the dot recesses DH. In one exemplary embodiment, the dot recesses DH may be formed by removing portions of the light guide plate 554 in the second area A2.

The dot recesses DH may be spaced apart from each other. As an example, the dot recesses DH may be arranged in a matrix form with rows and columns, but is not limited thereto or thereby. In the illustrated exemplary embodiment, each of the dot recesses DH has a circular shape when viewed in a plan view, but should not be limited to the circular planar shape. In an alternative exemplary embodiment, for instance, each of the dot recesses DH may have a polygonal planar shape, e.g., a triangular or rectangular shape, or an oval planar shape.

In addition, each of the dot recesses DH has a width W1 of about 10 micrometers to about 800 micrometers. When the width W1 is smaller than about 10 micrometers, manufacturing of the dot recesses DH may be difficult since the size of the dot recesses DH is relatively small. In addition, when the width W1 exceeds about 800 micrometers, the dot recesses DH may be undesirably perceived by the user through the display panel 520.

In the exemplary embodiment of the light guide plate 554 illustrated in FIGS. 8A and 8B, the exit surface S2 in the first area A1 and the exit surface S2 in the second area A2 are in different planes. The plane of the exit surface S2 in the second area A2 is closer to the bottom surface BS (refer to FIG. 2A) of the light guide plate 554 than the plane of the exit surface S2 in the first area A1, however, the invention is not limited thereto or thereby.

Figure 9:
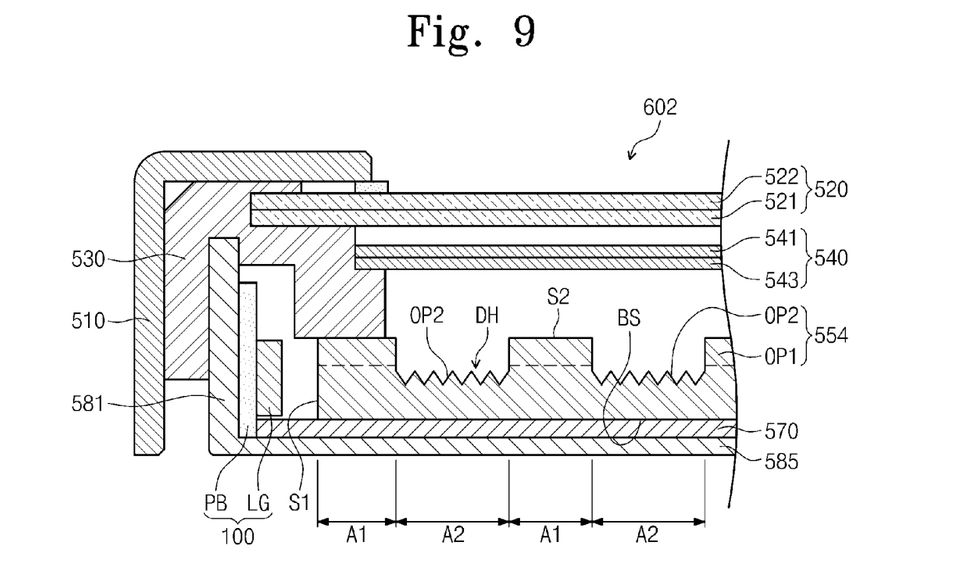
FIG. 9 is cross-sectional views showing still another exemplary embodiment of a display apparatus according to the invention.
Figure 10:
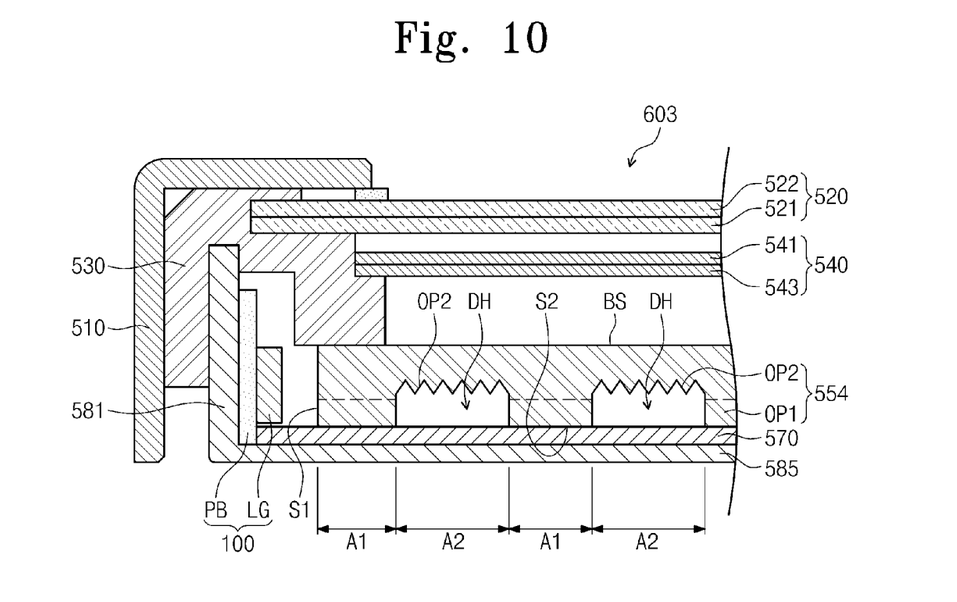
FIG. 10 is cross-sectional views showing yet another exemplary embodiment of a display apparatus according to the invention.

FIG. 9 is cross-sectional views showing still another exemplary embodiment of display apparatus according to the invention and FIG. 10 is cross-sectional views showing yet another exemplary embodiment of display apparatus according to the invention. In FIGS. 9 and 10, the same reference numerals denote the same elements in FIG. 6, and thus detailed descriptions of the same elements will be omitted.

Referring to FIG. 9, a display apparatus 602 includes the light guide plate 554 described with reference to FIGS. 7, 8A and 8B. In detail, similar to the display apparatus 600 shown in FIG. 2B, the light guide plate 554 is accommodated in the receiving container 580 such that the bottom surface BS of the light guide plate 554 is disposed closer to the bottom portion 585 of the receiving container 580 and the reflection plate 570 than the exit surface S2 of the light guide plate 554.

Referring to FIG. 10, a display apparatus 603 includes the light guide plate 554 described with reference to FIGS. 7, 8A and 8B. The light guide plate 554 is accommodated in the receiving container 580 such that the exit surface S2 of the light guide plate 554 is disposed closer to the bottom portion 585 of the receiving container 580 and the reflection plate 570 than the bottom surface BS of the light guide plate 554. Accordingly, as described with reference to FIG. 6, the optical distance is increased, and thus the diffusion sheet 543 may be at the optical distance sufficient to diffuse the exit light L2 exiting from the light guide plate 554.

Although exemplary embodiments of the invention have been described, it is understood that the invention should not be limited to these exemplary embodiments but various changes and modifications can be made by one ordinary skilled in the art within the spirit and scope of the invention as hereinafter claimed.

What is claimed is:

1. A display apparatus comprising:
   a backlight assembly which emits a light; and
   a display panel which receives the light emitted from the backlight assembly and displays an image using the light, the backlight assembly comprising:
      a light source which generates the light; and
      a light guide plate which receives the light generated by the light source through an incident surface thereof as an incident light, and outputs the incident light through an exit surface thereof as an exit light,
   wherein the light guide plate comprises:
      a bottom surface facing the exit surface;
      side surfaces connecting the exit surface and bottom surfaces to each other; and
      a total area of the exit surface defined by a first area and a second area,
      wherein
         a first optical pattern which collects the incident light and corresponds to the first area of the exit surface, an entirety of the first area of the exit surface comprising the first optical pattern elongated in the first direction substantially perpendicular to the incident surface of the light guide plate; and
         a second optical pattern which collects the exit light and corresponds to the second area of the exit surface excluding the first area, an entirety of the second area of the exit surface comprising the second optical pattern elongated in a second direction substantially parallel to the incident surface of the light guide plate,
         wherein the first area comprising the first optical pattern elongated in the first direction substantially perpendicular to the incident surface of the light guide plate is disposed between each second optical pattern and the side surfaces of the light guide plate in a plan view.

2. The display apparatus of claim 1, wherein the second optical pattern refracts the incident light and outputs the refracted incident light through the exit surface.

3. The display apparatus of claim 2, wherein the first optical pattern comprises a first protrusion, and the second optical pattern comprises a second protrusion.

4. The display apparatus of claim 3, wherein the light guide plate further comprises a dot portion corresponding to the second area, and the second optical pattern is on the dot portion.

5. The display apparatus of claim 4, wherein a width of the dot portion is about 10 micrometers to about 800 micrometers.

6. The display apparatus of claim 4, wherein the dot portion, the first optical pattern and the second optical pattern of the light guide plate are integral with each other.

7. The display apparatus of claim 4, further comprising a plurality of dot portions spaced apart from each other.

8. The display apparatus of claim 4, wherein
   the exit surface of the second area is further from the bottom surface than the exit surface of the first area.

9. The display apparatus of claim 3, wherein the light guide plate further comprises a dot recess corresponding to the second area, and the second optical pattern is in the dot recess.

10. The display apparatus of claim 9, wherein a width of the dot recess is about 10 micrometers to about 800 micrometers.

11. The display apparatus of claim 9, further comprising a plurality of dot recesses spaced apart from each other.

12. The display apparatus of claim 9, wherein
    the exit surface of the second area is closer to the bottom surface than the exit surface of the first area.

13. The display apparatus of claim 3, wherein the first protrusion or the second protrusion is prism-shaped in a sectional view.

14. The display apparatus of claim 3, wherein the first protrusion or the second protrusion is prism-shaped, and an apex of the prism shape is curved in a sectional view.

15. The display apparatus of claim 3, wherein the first protrusion or the second protrusion is lenticular-shaped in a sectional view.

16. The display apparatus of claim 1, wherein the backlight assembly further comprises:
 a receiving container comprising a bottom portion, and a sidewall extended from the bottom portion, in which the light source and the light guide plate are accommodated; and
 a reflection plate between the bottom portion of the receiving container and the light guide plate,
  wherein the first optical pattern and the second optical pattern face the reflection plate.

17. The display apparatus of claim 1, wherein the backlight assembly further comprises an optical sheet between the display panel and the light guide plate, wherein the optical sheet diffuses the exit light.

18. A method of manufacturing a display apparatus, the method comprising:
 providing a backlight assembly which emits a light; and
 providing a display panel which receives the light emitted from the backlight assembly and displays an image using the light,
 wherein the backlight assembly comprises:
  a light source which generates the light; and
  a light guide plate which receives the light generated by the light source through an incident surface thereof as an incident light, and outputs the incident light through an exit surface thereof as an exit light,
 wherein the light guide plate comprises:
  a bottom surface facing the exit surface;
  side surfaces connecting the exit surface and bottom surfaces to each other; and
  a total area of the exit surface defined by a first area and a second area,
 wherein
 a first optical pattern which collects the incident light and corresponds to the first area of the exit surface, an entirety of the first area of the exit surface comprising the first optical pattern elongated in the first direction substantially perpendicular to the incident surface of the light guide plate; and
 a second optical pattern which collects the exit light and corresponds to the second area of the exit surface excluding the first area, an entirety of the second area of the exit surface comprising the second optical pattern elongated in a second direction substantially parallel to the incident surface of the light guide plate,
 wherein the first area comprising the first optical pattern elongated in the first direction substantially perpendicular to the incident surface of the light guide plate is disposed between each second optical pattern and the side surfaces of the light guide plate in a plan view.

* * * * *